United States Patent
Colibert et al.

(10) Patent No.: US 7,988,177 B2
(45) Date of Patent: Aug. 2, 2011

(54) DISPLACEABLE FIFTH-WHEEL HITCH ASSEMBLY ADAPTABLE FOR USE WITH MULTIPLE VEHICLE HITCH COUPLING SYSTEMS

(75) Inventors: Gregory J. Colibert, Salt Lake City, UT (US); Jacque Colibert-Clarke, Salt Lake City, UT (US)

(73) Assignee: Camco Manufacturing, Inc., Greensboro, NC (US)

( * ) Notice: Subject to any disclaimer, the term of this patent is extended or adjusted under 35 U.S.C. 154(b) by 409 days.

(21) Appl. No.: 12/075,784

(22) Filed: Mar. 12, 2008

(65) Prior Publication Data

US 2009/0127822 A1 May 21, 2009

Related U.S. Application Data

(60) Provisional application No. 61/003,939, filed on Nov. 20, 2007.

(51) Int. Cl.
*B60D 1/52* (2006.01)

(52) U.S. Cl. .................... 280/441.1; 280/417.1; 280/901

(58) Field of Classification Search ............... 280/438.1, 280/441, 441.1, 416.1, 416.3, 417.1, 901
See application file for complete search history.

(56) References Cited

U.S. PATENT DOCUMENTS

| | | |
|---|---|---|
| 2,475,878 A | 7/1949 | Clark et al. |
| 3,164,399 A | 1/1965 | Lugash |
| 3,390,896 A | 7/1968 | Philapy |
| 3,527,476 A | 9/1970 | Winckler |
| 3,733,089 A | 5/1973 | Goecke et al. |
| 3,788,673 A | 1/1974 | Gloege |
| 3,826,516 A * | 7/1974 | Weber ............................ 280/407 |
| 3,889,978 A | 6/1975 | Kann |
| 4,183,548 A | 1/1980 | Schneckloth |
| 4,266,797 A | 5/1981 | Rhodes |
| 4,832,358 A | 5/1989 | Bull |
| 5,016,898 A | 5/1991 | Works et al. |
| 5,058,915 A | 10/1991 | Burns |
| 5,344,172 A * | 9/1994 | Jaun ........................... 280/415.1 |
| 5,513,869 A * | 5/1996 | Putnam ....................... 280/415.1 |
| 5,788,257 A * | 8/1998 | Meyerhofer ............... 280/416.1 |
| 6,170,850 B1 | 1/2001 | Works |
| 6,695,338 B1 * | 2/2004 | Roberts ....................... 280/491.5 |
| 6,969,090 B1 | 11/2005 | Works |
| 7,011,327 B2 * | 3/2006 | Colibert et al. ............. 280/479.1 |
| 7,152,870 B2 * | 12/2006 | Gurtler ........................... 280/483 |
| 7,673,895 B1 * | 3/2010 | Hesse et al. ................. 280/417.1 |
| 2006/0087100 A1 * | 4/2006 | Gurtler ....................... 280/491.5 |

OTHER PUBLICATIONS

Colibert, et al.; U.S. Appl. No. 12/075,785, filed Mar. 12, 2008.
Colibert, et al.; U.S. Appl. No. 12/075,803, filed Mar. 12, 2008.

* cited by examiner

Primary Examiner — Kevin Hurley

(57) ABSTRACT

An adaptive displaceable fifth-wheel hitch system operable with a vehicle hitch coupling system comprising a fifth-wheel hitch, a displacement mechanism operable to couple and displace the fifth-wheel hitch in a bi-directional, an adapter configured to operably relate the displacement mechanism to a vehicle hitch coupling system, the displacement mechanism and vehicle hitch coupling system otherwise being incompatible and inoperable with one another, and the adapter comprising a first interface operable to relate the adapter to the displacement mechanism; and a second interface operable to relate and removably couple the adapter to the vehicle hitch coupling system.

26 Claims, 10 Drawing Sheets

DISPLACEABLE FIFTH-WHEEL HITCH ASSEMBLY ADAPTABLE FOR USE WITH MULTIPLE VEHICLE HITCH COUPLING SYSTEMS

RELATED APPLICATIONS

This invention claims the benefit of U.S. Provisional Application Ser. No. 61/003,939, filed Nov. 20, 2007, and entitled, "Displaceable Fifth-wheel Hitch Assembly Adaptable for Use with Multiple Vehicle Hitch Coupling Systems," which is incorporated by reference in its entirety herein.

FIELD OF THE INVENTION

The present invention relates to hitches and hitch systems operable with a vehicle and a vehicle mounting assembly, and more particularly to fifth-wheel hitches and their vehicle hitch coupling systems.

BACKGROUND OF THE INVENTION AND RELATED ART

A fifth-wheel trailer is generally a large, high profile trailer which is coupled to a large towing vehicle, such as a large pick-up truck. The fifth-wheel trailer is typically coupled to the towing vehicle using a fifth-wheel hitch or a ball hitch. A fifth-wheel hitch is typically mounted in the bed of the truck and is made to couple directly to the fifth-wheel trailer. Fifth-wheel hitches can comprise a movable or displaceable assembly that allows the point of coupling to be displaced, or they can be stationary with the point of coupling fixed. Stationary hitches are typically limited to operation with long-bed trucks because during sharp turns, the hitches often move through a wide range of motion utilizing space that may not be available in short-bed trucks. In many cases, short-bed trucks are designed in a manner such that they do not provide enough clearance between the cab of the short-bed truck and the front of a fifth-wheel trailer.

To overcome this problem, and to broaden the types of vehicles with which fifth-wheel hitches can be used, some fifth-wheel hitch assemblies have been designed to displace the fifth-wheel hitch back and forth between a rearward towing position and a position closer to a truck's tailgate, thus providing a short-bed truck the additional clearance required for executing sharp turns. In addition, fifth-wheel hitches are now being designed to be removable from the bed of a truck to permit full and unobstructed use of the bed of the truck when the fifth-wheel trailer is not being used. The result is a displaceable fifth-wheel hitch assembly that is removable from the truck bed.

Despite these apparent advantages, many displaceable fifth-wheel hitches utilize an assisted displacing system, such as a pneumatic system, that assists the operator in actuating the displacement mechanism of the fifth-wheel hitch. While efficient and convenient, such systems are expensive and are more prone to malfunction.

In addition, many displaceable fifth-wheel hitches, particularly those that are removable from the towing vehicle, typically utilize a vehicle hitch coupling system that itself is permanently or substantially permanently mounted to the towing vehicle, such as the towing vehicle frame, and that is used to support specific types of fifth-wheel hitches or that is used for stationary hitches. For instance, many conventional vehicle hitch coupling systems comprise a receiving component or portion that is designed and configured to only interface with a matching or corresponding coupling component or portion of a single, specific displaceable hitching member. Likewise, conventional hitching members, namely displaceable fifth-wheel hitches, are intended for use with a single, specific type of vehicle hitch coupling system. Such proprietary relationships between the hitching member and the vehicle hitch coupling system severely limits individual choice and/or selection. In addition, such proprietary relationships significantly increases costs in the event one desires to use a different hitching member with an existing towing vehicle, or vice versa, when one desires to use a different towing vehicle with an existing hitching member.

SUMMARY OF THE INVENTION

In light of the problems and deficiencies inherent in the prior art, the present invention seeks to overcome these by providing an adaptive displaceable fifth-wheel hitch system, wherein the adaptive displaceable fifth-wheel hitch system comprises an adapter operable with a displacement mechanism and fifth-wheel hitch, and an otherwise incompatible vehicle hitch coupling system, and wherein the adapter operably relates the displacement mechanism and fifth-wheel hitch to the otherwise incompatible and inoperable vehicle hitch coupling system to couple the fifth-wheel trailer to the towing vehicle.

In accordance with the invention as embodied and broadly described herein, the present invention resides in an adaptive displaceable fifth-wheel hitch system operable with a vehicle hitch coupling system comprising a fifth-wheel hitch; a displacement mechanism operable to couple and displace the fifth-wheel hitch in a bi-directional; an adapter configured to operably relate the displacement mechanism to a vehicle hitch coupling system, the displacement mechanism and vehicle hitch coupling system otherwise being incompatible and inoperable with one another, and the adapter comprising: a first interface operable to relate the adapter to the displacement mechanism; and a second interface operable to relate and removably couple the adapter to the vehicle hitch coupling system.

The present invention also resides in an adaptive displaceable fifth-wheel hitch system operable with a vehicle hitch coupling system, comprising a fifth-wheel hitch; a displacement mechanism configured to be mounted in the bed of a truck and to permit bi-directional displacement of the fifth-wheel hitch relative to the truck; an adapter configured to operably relate and removably couple the displacement mechanism to the vehicle hitch coupling system, the displacement mechanism and the vehicle hitch coupling system otherwise being inoperable with one another, and the adapter comprising: a mounting component having a first interface operable to relate and secure the adapter to the displaceable fifth-wheel hitch assembly; and a coupling component having a second interface operable to relate and secure the adapter to the vehicle hitch coupling system, the coupling component corresponding to a receiving component of the vehicle hitch coupling system.

The present invention further resides in an adapter configured to operably relate a displacement mechanism to a vehicle hitch coupling system, the displacement mechanism and the vehicle hitch coupling system otherwise being incompatible and inoperable with one another, the adapter comprising a first interface operable to relate the adapter to the displacement mechanism; and a second interface operable to relate and removably couple the adapter to the vehicle hitch coupling system.

The present invention still further resides in a method for operably relating a displacement mechanism and a corresponding fifth-wheel hitch to a vehicle hitch coupling system of a vehicle that is otherwise incompatible and inoperable with the displacement mechanism, the method comprising obtaining a displacement mechanism mountable in a vehicle; obtaining a vehicle hitch coupling system being previously incompatible and inoperable with the displacement mechanism; obtaining an adapter having a first interface that relates to the displacement mechanism, and a second interface that relates to the vehicle hitch coupling system; and interfacing the displacement mechanism with the vehicle hitch coupling system using the adapter to enable the fifth-wheel hitch to function with and slidably displace with respect to the vehicle.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1:
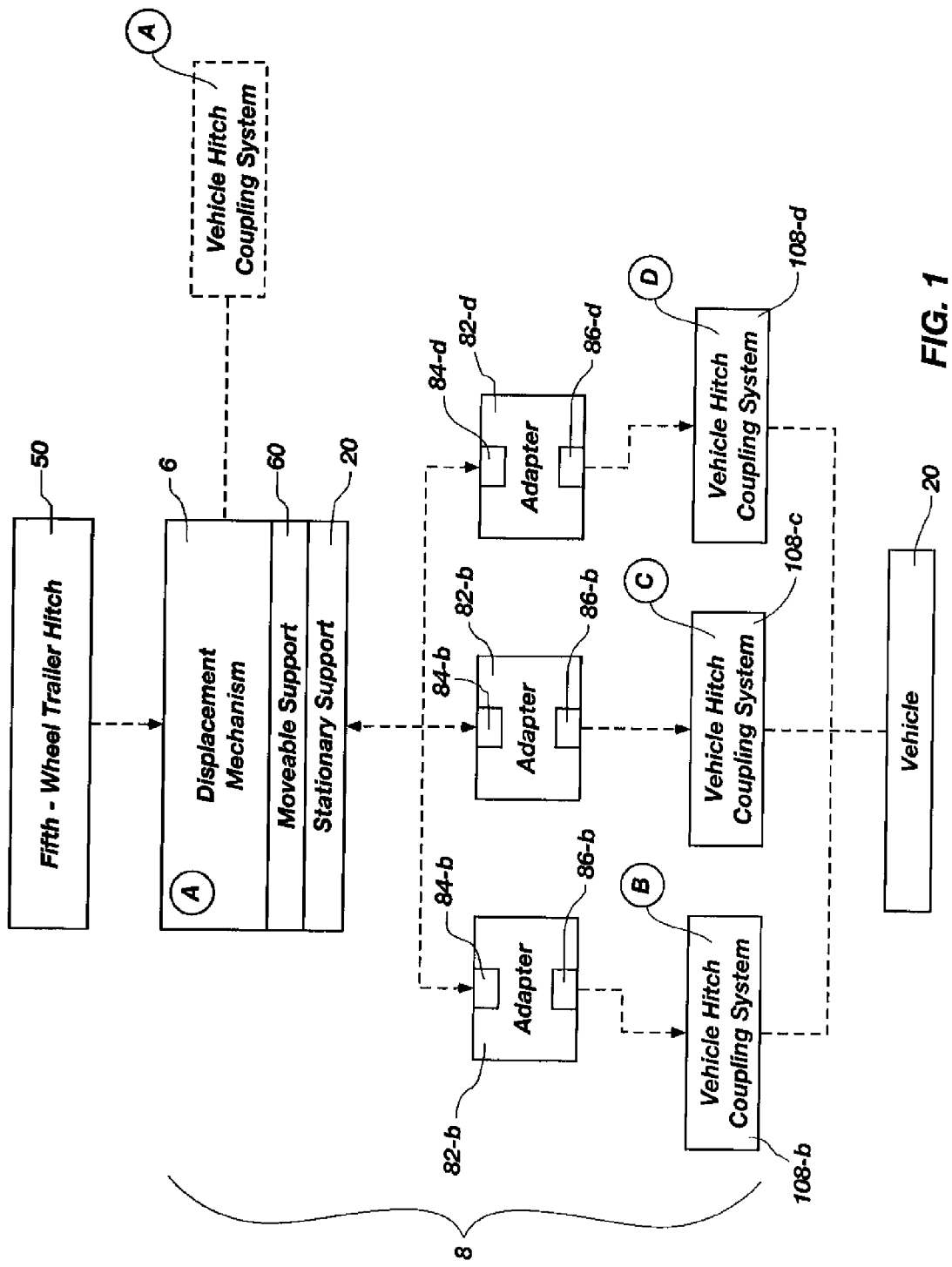
FIG. 1 illustrates a general block diagram of an adaptive displaceable fifth-wheel hitch system in accordance with the present invention, wherein the diagram depicts a fifth-wheel hitch and further depicts a displacement mechanism of type A that is made to be operable with one or more vehicle hitch coupling systems of another or different type through use of an adapter.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and system for enabling a displacement mechanism and related fifth-wheel hitch of one type to operate and be compatible with a vehicle hitch coupling system generally configured to couple to and operate with a displacement mechanism of a different type. The displacement mechanism may be a separate component from the fifth-wheel hitch, or it may be an integrally formed component.

The present invention provides several significant advantages over prior related fifth-wheel hitches and displaceable fifth-wheel hitches, some of which are recited here and throughout the following more detailed description. First, the present invention adaptive displaceable fifth-wheel hitch system permits a single displacement mechanism (and corresponding fifth-wheel hitch) that is otherwise operable and compatible with only a certain type of vehicle hitch coupling system to be operable and compatible with multiple vehicle hitch coupling systems by utilizing an appropriate adapter. Second, users desiring to purchase a displacement mechanism are able to select a certain type of displacement mechanism and fifth-wheel hitch independent of any vehicle hitch coupling system, thus providing a greater degree of choice and flexibility to consumers. Third, users having an existing vehicle hitch coupling system are able to choose from multiple different types of fifth-wheel hitches and corresponding displacement mechanisms previously incompatible and inoperable with their current vehicle hitch coupling system. The same may be said for those having existing displacement mechanisms who desire to use a different vehicle hitch coupling system. Fourth, the present invention enables proper displacement of the fifth-wheel hitch to provide the required cab/fifth-wheel trailer clearance enabling a short-bed truck to tow a fifth-wheel trailer, while enabling a single displacement mechanism to be compatible with multiple short-bed trucks having different vehicle hitch coupling systems. Fifth, the present invention provides a displacement mechanism that is easy to operate, and robust in its configuration.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

With reference to FIG. 1, illustrated is a general block diagram of an adaptive displaceable fifth-wheel hitch system in accordance with one exemplary embodiment of the present invention. As shown, the adaptive displaceable fifth-wheel hitch system 8 comprises a fifth-wheel hitch 50 operable with a displacement mechanism 6 of type A that is generally thought to be usable only with a vehicle hitch coupling system also of type A (shown in dotted lines). The displacement mechanism 6 and fifth-wheel hitch 50 may comprise any type or design known in the art. As illustrated in FIG. 1, the displacement mechanism 6 may comprise a stationary support 20 and a movable support 60, wherein the movable support 60 is operable with the stationary support 20 and capable of coupling and bi-directionally displacing the fifth-wheel hitch 50, and wherein the stationary support 20 is operable with a vehicle hitch coupling system of a vehicle 2, as is commonly known in the art.

The adaptive displaceable fifth-wheel hitch system 8 further comprises one or more adapters designed and configured to operably relate and secure or couple together otherwise inoperable and incompatible fifth-wheel hitches, and their associated displacement mechanisms, with vehicle hitch coupling systems. The adapters are also designed and configured to operably relate and secure or couple together otherwise inoperable and incompatible fifth-wheel hitches, and their displacement mechanisms, and vehicle hitch coupling systems, wherein such vehicle hitch coupling system are not designed and intended to operate with a displaceable fifth-wheel hitch system.

As shown, the adapter 82-b is designed and configured to operably relate and secure the fifth-wheel hitch 50 and displacement mechanism 6 of type A to a vehicle hitch coupling system 108-b of type B operable with towing vehicle 2, wherein the vehicle hitch coupling system 108-b of type B is generally thought to be usable only with a displacement mechanism and fifth-wheel hitch also of type B (not shown). Similarly, the adapter 82-c is designed and configured to operably relate and secure the same fifth-wheel hitch 50 and displacement mechanism 6 of type A to a still different vehicle hitch coupling system 108-c of type C, wherein the vehicle hitch coupling system 108-c of type C is generally thought to be usable only with a fifth-wheel hitch and displacement mechanism also of type C (not shown). Also shown is adapter 82-d which is designed and configured to operably relate and secure the same fifth-wheel hitch 50 and displacement mechanism 6 of type A to a still different vehicle hitch coupling system 108-d of type D, wherein the vehicle hitch coupling system 108-d of type D is generally thought to be usable only with a displacement mechanism or fifth-wheel hitch assembly also of type D (not shown). As can be seen, it is contemplated that a single fifth-wheel hitch and associated displacement mechanism 6 of one type may be made to be compatible and operable with multiple different types of vehicle hitch coupling systems of different types (and vice versa) simply by utilizing an appropriately configured adapter. Similarly, it is contemplated that a single fifth-wheel hitch 50 of one type may be made to be usable and displaceable with towing vehicles having vehicle hitch coupling systems of different types by coupling the fifth-wheel hitch to an appropriate displacement mechanism and utilizing an appropriate adapter.

The adapters 82 of the adaptive displaceable fifth-wheel hitch system 8 each comprise a first interface 84 designed and intended to operate or function with one or more components of the displacement mechanism 6. The first interface 84 may be embodied in a structural mounting component sized and configured to function and correspond to a structural arrangement on the displacement mechanism 6, or one or more of its components. Likewise, the adapters 82 each comprise a second interface 86 designed and intended to operate or function with one or more components of the vehicle hitch coupling system 108. The second interface 86 may be embodied in a structural coupling component sized and configured to function with and correspond to a structural receiving component on the vehicle hitch coupling system 108. In other words, the coupling component and the second interface 86 are intended to engage and mate with the receiving component of the desired vehicle hitch coupling system.

As the adapters 82-b, 82-c, and 82-d are each shown as being intended for use with the fifth-wheel hitch 50 and particularly the displacement mechanism 6, the first interfaces 84-b, 84-c, and 84-d, respectively, are shown as being the same. However, as the adapters 82-b, 82-c and 82-d are each shown as being intended for use with different vehicle hitch mounting systems, shown as systems 108-b, 108-c and 108-d, respectively, each adapter is shown as comprising a different second interface, one that will enable it to be operable with a corresponding vehicle hitch coupling system. It is contemplated herein that an adapter may be designed and configured to operably associate and relate any type of fifth-wheel hitch and its accompanying displacement mechanism with any type of vehicle hitch coupling system, notwithstanding other design considerations that may make such a relationship not practical or desirable. As can be seen, the present invention enables the displacement mechanism 6 to be adapted for use with multiple different types of vehicle hitch coupling systems, and thus, the present invention enables the fifth-wheel hitch 50 to be usable and displaceable in vehicles having different types of vehicle hitch coupling systems.

The adapter 82 may be related and secured to the displacement mechanism 6, via the mounting component and the first interface 84, using any type of coupling or joining means. In one aspect, the adapter 82 may be permanently joined to the displacement mechanism 6, such as via one or more welds. In another aspect, the adapter 82 may be removably coupled to the displacement mechanism 6, such as via one or more fasteners or coupling means, such as bolts, threads, etc. One particular advantage of providing an adapter that is removably coupled to the displacement mechanism is that adapters may be interchanged with one another as needed. The coupling component and second interface 86 of the adapter is intended to removably couple the vehicle hitch coupling system in order to allow the displacement mechanism 6 to be removable from the vehicle 2.

Figure 2:
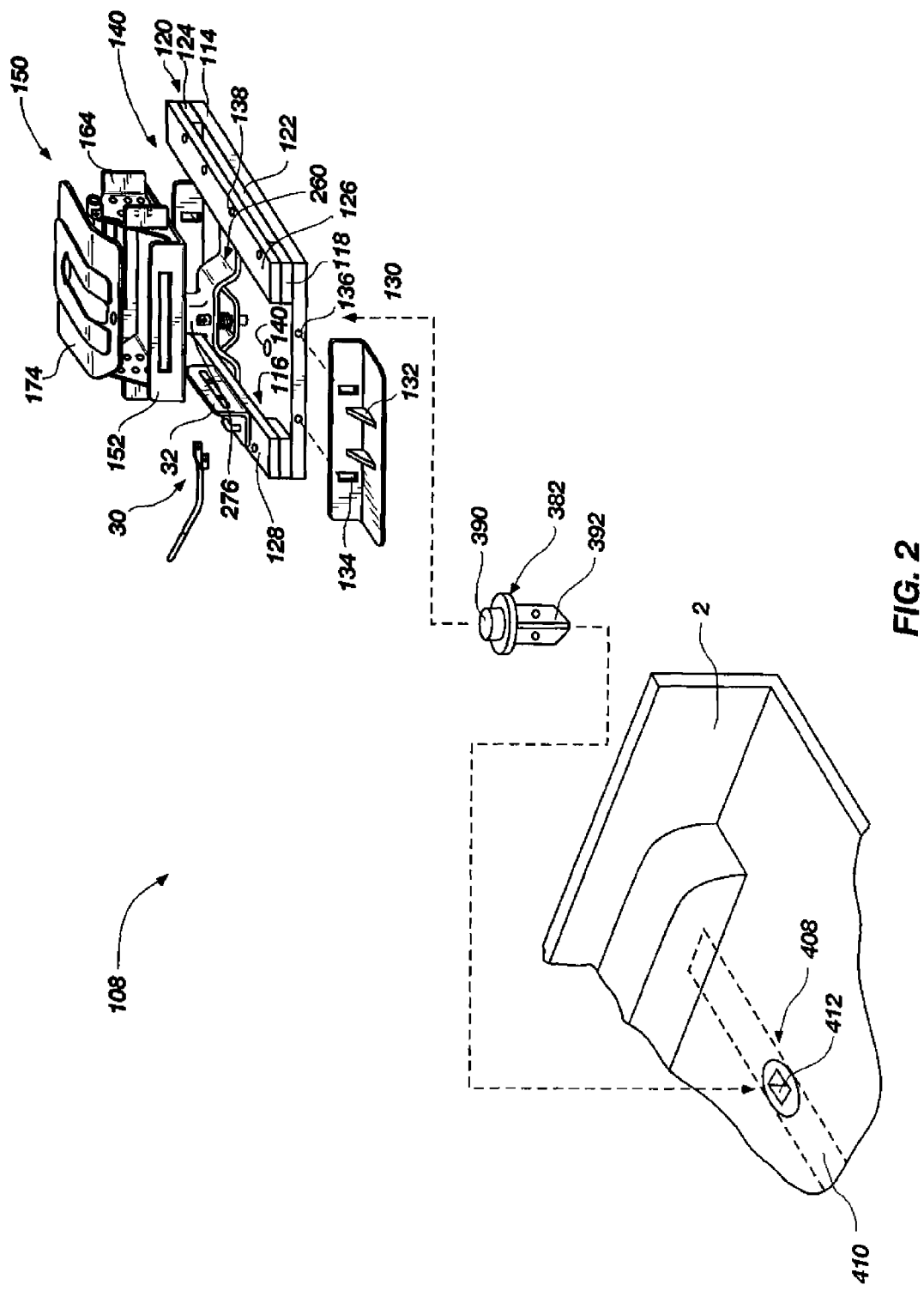
FIG. 2 illustrates an exploded perspective view of a more specific adaptive displaceable fifth-wheel hitch system in accordance with one exemplary embodiment of the present invention.
Figure 3:
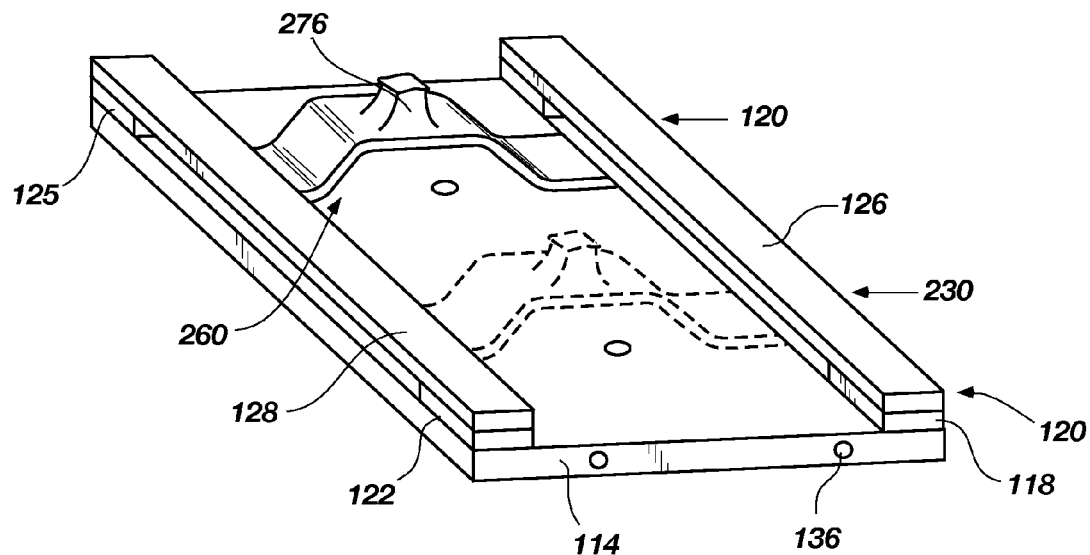
FIG. 3 illustrates a perspective view of the displacement mechanism with the fifth-wheel hitch removed and with a platform depicted as occupying an upper and lower position in relation to a platform track.

With reference to FIG. 2, illustrated is an exploded perspective view of an adaptive displaceable fifth-wheel hitch system in accordance with one exemplary embodiment of the present invention. As shown, the adaptive displaceable fifth-wheel hitch system 108 comprises a specific type of displacement mechanism 106 and fifth-wheel hitch 150 similar to those manufactured, sold and/or owned by Colibert Enterprises of Salt Lake City, Utah. The displacement mechanism 106 is shown as comprising a stationary support having the form of a platform track 120 and a movable support having the form of a platform 260. The fifth-wheel hitch 150 is shown as comprising a base component 152, a head mounting plate 164, and a head component 174. The fifth-wheel hitch 150 is configured to removably couple a fifth-wheel trailer (not shown), with the base component 152 and head mounting plate 164 being configured to support the head component 174, and with the base component 152 configured to couple the to the platform 260. The platform 260 is configured to be positioned and slidably move within a track space 116 defined by the configuration of the platform track 120, wherein the platform track 120 and track space 116 allow the platform 260 to displace from a first or upper position 220 to a second or lower position 230 or from a second lower position 230 to a first upper position 220, as shown in FIG. 3, and any available interim position. Bi-directional displacement of the fifth-wheel hitch is achieved by interfacing the fifth-wheel hitch 150 with the platform 260. This can be accomplished using an interfacing member such as a riser 276 or coupling the fifth-wheel hitch 150 directly to the platform 260. Furthermore, the platform track 120 is configured to be mountable within the vehicle 2 via the vehicle hitch coupling system 408. For exemplary purposes, it is noted that the receiving component 412 of the vehicle hitch coupling system 408, as well as the coupling component of the adapter 382, are shown as being similar to the receiving components of the vehicle hitch coupling systems and corresponding coupling components of the hitch balls, respectively, that are each manufactured and sold by B&W Custom Truck Beds, Inc. of Humboldt, Kans. However, this coupling configuration and system is not meant to be limiting in any way.

As the displacement mechanism 106 is of one type, and as the vehicle hitch coupling system 408 is of another or of a different type, rendering these otherwise incompatible or inoperable with one another, the adaptive displaceable fifth-will hitch system 108 is shown as comprising an adapter 382 that functions to enable the displacement mechanism 106 to be used with the vehicle hitch coupling system 408. The adapter 382 comprises a mounting component 390 having a specifically configured interface that corresponds to an interface of a structural arrangement of the displacement mechanism 106, and more particularly of the platform track 120. The mounting component 390 effectively joins the adapter 382 to the platform track 120 of the displacement mechanism 106.

The adapter 382 further comprises a coupling component 392 having a specifically configured interface that corresponds to an interface of a receiving component 412 supported by a vehicle mount 410 of the vehicle hitch coupling system 408. Once the adapter 382 is joined with the displacement mechanism 106, the entire adaptive displaceable fifth-wheel hitch system 108 can be lowered into the vehicle 2 and the adapter 382 caused to removably couple to the vehicle hitch coupling system 408. More specifically, the coupling component 392 may be caused to engage and be inserted into the receiving component 412, wherein the coupling component 392 comprises the same geometric configuration and substantially the same size as that of the receiving component 412. Once inserted, the adapter 382, and therefore the displacement mechanism 106, may be secured in place in the vehicle 2 using the same means of the vehicle hitch coupling system 408 used to couple its regular or compatible displacement mechanism or fifth-wheel hitch assembly that doesn't require an adapter.

Figure 4:
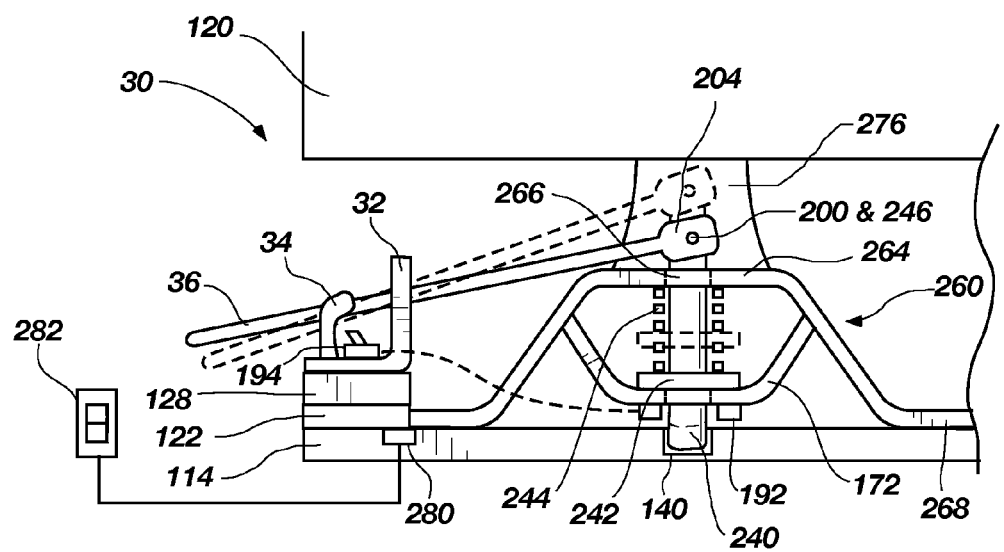
FIG. 4 illustrates a front view of the platform and an adjustment assembly with the platform being locked into place by a locking pin and the dashed lines depicting the locking pin being displaced from a locking position by a rod and an adjustment bracket.

FIGS. 2, 3 and 4 further illustrate the platform track 120 of the displacement mechanism 106. Specifically, the platform track 120 can include a bottom plate 114, first and second upper plates 126 and 128 and various spacers, such as front right and left spacers 118 and 122 and rear right and left spacers 124 and 125. The platform track 120 can be made with the first and second upper plates 126 and 128 disposed over a top surface of the bottom plate 114 with each of the spacers sandwiched therebetween. In particular, the right front and back spacers 118 and 124 can be positioned on the top surface of the bottom plate 114 and substantially flush with the edges at each corner of the bottom plate 114. The length of the right front and back spacers 118 and 124 can be substantially the same as the width of the first and second upper plates 126 and 128. The left front and back spacers 122 and 125 also are positioned on the top surface extending lengthwise on first and second longitudinal sides of the bottom plate 114 and substantially flush with the first and second edges of the bottom plate 114. The width of the left front and back spacers 122 and 125 are sized smaller than the width of the first and second upper plates 126 and 128. The first and second upper plates 126 and 128 can then be positioned over each of the spacers so that the outer edges are flush with the outer edges of each of the spacers and the bottom plate 114 and the inner edges of the first and second upper plates 126 and 128 over hang past the inner edges of the spacers 122 and 125. Each of the bottom plate 114, spacers and first and second upper plates 126 and 128 include apertures 138 extending therethrough configured to receive bolts for fastening each of the bottom and upper plates and spacers together. With this arrangement, each of the spacers, the first and second upper plates 126 and 128, and the bottom plate 114 operate to define a track space 116 within the platform track 120. The front spacers 118 and 122 and back spacers 124 and 125 define opposing ends of the track space 116 and the spacers 122 and 125, having a smaller sized width than the first and second upper plates 126 and 128, define sides of the track space 116.

Further, the bottom plate 114 may include one or more apertures 140 extending therethrough to receive a locking pin 240 and to define a plurality of available locking positions. The locking pin 240 is part of an adjustment assembly 30 and is used as a means for locking or securing the platform 260 in any of the available locking positions, such as the upper position 220 and lower position 230 shown in FIG. 3. The bottom plate 114 may also include apertures 136 located on the front and back face and extending into the bottom plate 114 parallel with the longitudinal sides of the bottom plate 114, which apertures are used for securing a support device, such as a support bracket 130. The adjustment assembly 30 may further comprise an adjustment bracket 32 coupled with the first or second upper plates 126 and 128, which adjustment bracket 32 provides means for facilitating the displacement of the platform 260.

FIG. 2 illustrates support brackets (see support bracket 130) as mounted on the front and back face of the platform track 120, which support brackets function to provide support to the platform track relative to the surface of the towing vehicle (e.g., truck bed), as well as to facilitate height adjustment of the platform track relative to the vehicle surface. Using support bracket 130 as an example, the support brackets may be reinforced using ribs 132 and may include slots 134 extending therethrough that permit the support brackets to slidably couple to the bottom plate 114 via the apertures 136, and allow the support bracket 130 to adjust vertically relative to the platform track 120, as indicated by the arrows. In other words, adjusting the support brackets results in height adjustment of the platform track. As the support bracket is adjusted, the underside surface of the support bracket may be positioned at different positions relative to the underside surface of the bottom plate 114. The adjustability of the support bracket 130 functions to adjust the height of the platform track 120 relative to the bed or other surface of the vehicle in which it is mounted. Indeed, this adjustability feature allows and compensates for varying vehicle surfaces, such as would exist in the presence of a truck bed liner (not shown). The support bracket facilitates the securing of the platform track 120 to the vehicle surfaces, which may vary in thickness and configuration. It will realized by those skilled in the art that other support device designs may be employed to adjustably support the platform track. Therefore, the description herein is not meant to be limiting in any way.

FIGS. 3 and 4 illustrate the platform 260, which can be sized and configured to be positioned in the track space 116 of the platform track 120. The platform 260 can include a raised portion 264 and a lower portion 268, wherein the lower portion 268 extends outward from opposing sides of the raised portion 264 and between the bottom plate 114 and the respective first and second upper plates 126 and 128. In this manner, the lower portion 268 is confined within the track space 116 of the platform track 120 and configured to slidably move within the track space 116. The track space 116 can be lubricated with a grease type lubricant to reduce the friction between the platform 260 and the components defining the track 116. In addition, the platform 260 may be slidably disposed within the track using other suitable means, such as with rollers, bearings, etc., as known in the art.

Figure 6:
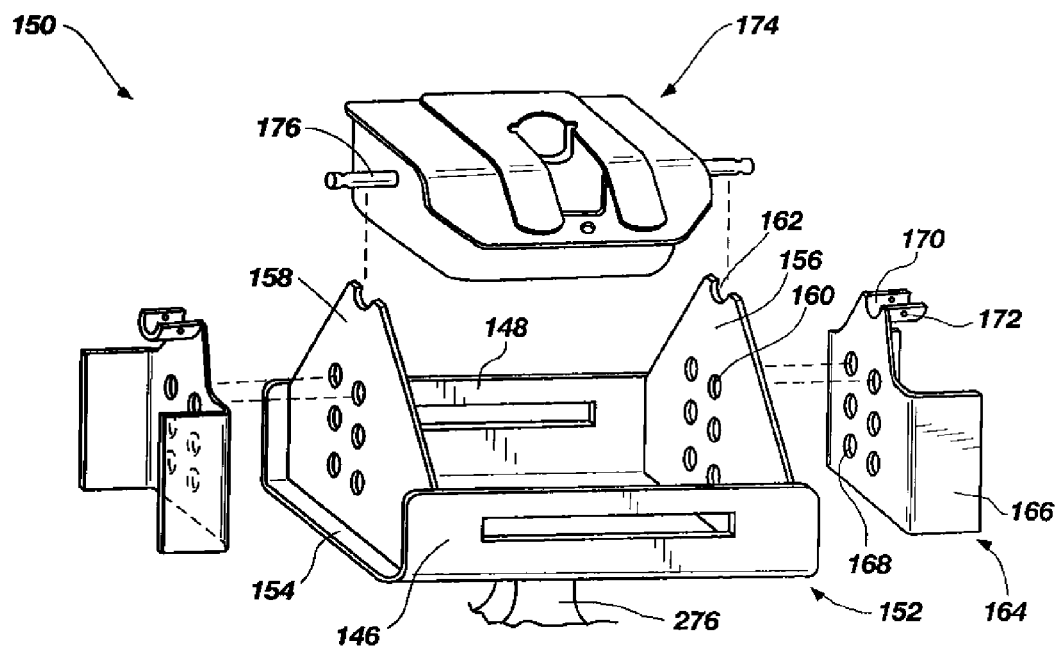
FIG. 6 illustrates an exploded view of a fifth-wheel hitch consisting of a head component, a head mounting plate, and a base component according to an exemplary embodiment of the present invention.

Referring now to FIGS. 3, 4 and 6, as illustrated, the fifth-wheel hitch 150 can be operably related and interfaced with the platform 260 to permit the fifth-wheel hitch 150 to be movable with respect to the towing vehicle. One embodiment of the interfacing member, as shown according to the present invention, can include a riser 276 extending upward from the raised portion 264 of the platform track 260, wherein the riser 276 supports and locates the fifth-wheel hitch 150 about the platform 260 above the platform track 120 and enables the fifth-wheel hitch 150 to displace bi-directionally via the platform 260. The fifth-wheel hitch 150 may be coupled to the riser 276 using welds, bolts, or any other joining means known in the art. In another embodiment, the fifth-wheel hitch 150 can be related to and interfaced with the platform 260 by securing the fifth-wheel hitch directly to the platform. It will be obvious to one skilled in the art that multiple methods may be employed for operably relating and interfacing the fifth-wheel hitch 150 and platform 260. As such, the above description is not meant to be limiting in any way.

FIG. 6 further illustrates the fifth-wheel hitch 150 as comprising a head component 174, a head mounting plates 164, and a base component 152. The head component 174 is operable to removably couple to a fifth-wheel trailer (not shown). The base component 152 comprises a low profile design with a lower plate 154 having opposing side members 146 and 148 extending upward therefrom. The base component 152 further comprises opposing brackets 156 and 158 that also extend upward from the lower plate 154, and that each comprise a u-shaped notch 162 for receiving corresponding posts 176 of the head component 174 therein. The opposing brackets 156 and 158 further comprise a series of apertures 160 formed therein for adjustably coupling respective head mounting plates 164 having an inverted u-shaped channel 170 and aperture 172 for pivotally supporting and coupling the posts 176 of the head component 174. Adjusting the support brackets about the end brackets 156 and 158 effectively functions to adjust the height of the head component 174 relative to the base component 152, thus allowing the fifth-wheel hitch 150 to compensate for various truck/fifth-wheel trailer configurations.

FIG. 4 illustrates means for locking the platform in one of several positions with respect to the platform track as part of an adjustment assembly 30. Specifically, as one embodiment of the present invention, the platform may be mechanically locked or secured in place via a locking pin 240 operable with the platform 260 and configured to maintain a locked position in which the locking pin 240 is positioned in one of the apertures 140 (see FIG. 2) of the platform track 120. More specifically, the platform 260 can include a lower support 272 and an aperture 266, sized slightly larger than the locking pin 240, extending through the platform and lower support. The locking pin 240 may be inserted into the aperture and coupled to a clip 242 in a manner permitting the clip to rest on the upper surface of the lower support when the locking pin 240 occupies its locking position. Further, a spring 244 may be situated to rest on the underside of the platform 260 and on the upper surface of the clip 242 in a manner to produce a downward biasing force on the locking pin 240 via the clip 242. As the platform displaces, the locking pin 240 may be made to slide along the upper surface of the bottom plate 114 via the clip 242 and spring 244 until an aperture 140 (see FIG. 2) of the bottom plate is encountered, wherein the locking pin 240 is compelled into its locking position by the spring 244.

Another embodiment of locking the platform in place with respect to the platform track 10 is illustrated in FIG. 4. In this embodiment, means for locking can include an electromagnet 280 embedded in the platform track 120, coupled to an electric switch 282. The electromagnet can be configured in a manner to electrically lock or secure an electrically conductive platform to the platform track when the electric switch is activated and to unlock the platform when the switch is deactivated. In any case, various means for locking or securing the platform in place with respect to the platform track may be employed. Therefore, that described herein and shown in the drawings is not meant to be limited in any way.

Figure 5:
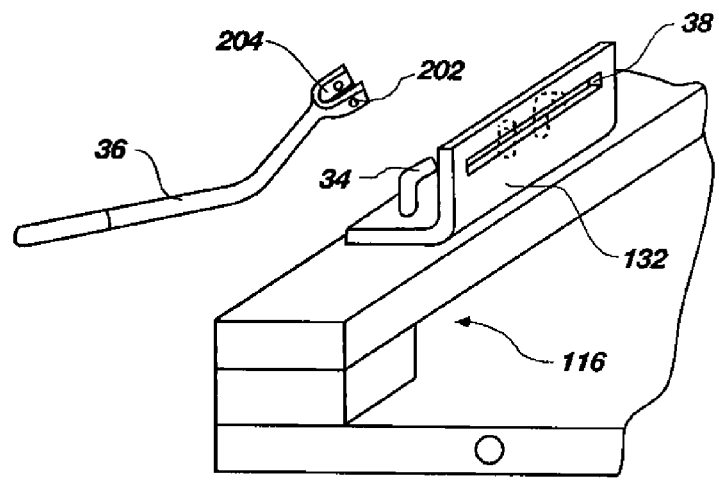
FIG. 5 illustrates a perspective view of a portion of the adjustment assembly, coupled to the platform track.

Referring now to FIGS. 4 and 5, illustrated is means for facilitating the displacement of the platform 260 according to one embodiment of the present invention. As shown as part of the adjustment assembly 30, the platform track 120 can include a rod 36 and an adjustment bracket 32 configured as a mechanical device to facilitate the displacement of the platform 260 and fifth-wheel hitch 150 (see FIG. 2). The adjustment bracket 32 may be configured to couple to the first or second upper plates 126 and 128 via bolts, welds, or some other method suitable for that purpose, and may include a slot or window 38 formed therein. The window 38 permits the adjustment rod 36 to pass through the adjustment bracket 32 to access and engage the locking pin 240. Furthermore, the adjustment bracket 32 and adjustment window 38 may be positioned about the platform track 120 in a manner permitting the adjustment rod 36 to access and engage the locking pin 240 when the platform occupies any one of the available locking positions, such as the upper locking position 220 or lower locking position 230 shown in FIG. 3.

The adjustment rod 36 may also include a fork or u-shaped end 204, sized slightly larger than the locking pin 240 to receive the locking pin 240 therein, and an aperture 202, extending through each of the prongs of the fork 204, which apertures may facilitate coupling of the adjustment rod 36 to the locking pin 240. As engaged with the locking pin 240, the adjustment rod 36 may be manipulated to displace the locking pin 240 from its current locking position (shown by the dashed line). This can be accomplished by placing the adjustment rod 36 through the adjustment window 38, causing the fork 204 to engage the locking pin 240, aligning the aperture 202 in the fork 102 with an aperture 246 formed in the locking pin 240, coupling the adjustment rod 36 to the locking pin 240 by inserting a pin (not shown) through the aligned apertures, and applying a downward force on the opposing end of the adjustment rod 36. The downward force causes the adjustment rod 36 to pivot about the adjustment bracket 32, thus allowing the adjustment rod 36 to function as a lever to lift the locking pin 240 out of its current aperture. With the locking pin 240 disengaged, the platform 260 may then be caused to slide or displace bi-directionally within the track 160 to a new location and locking position, with the adjustment rod 36 sliding within the window 38, thus effectively relocating the fifth-wheel hitch as well.

The present invention may further comprise means for facilitating or assisting the displacement of the platform and fifth-wheel hitch. In one embodiment, shown in FIG. 4, an electronic device 192 can be employed, which electronic device comprises a solenoid that can be coupled to the platform and configured to activate when an electronic switch 194 is activated that is mounted on the platform track or in some other suitable location. The solenoid can be further configured to displace the locking pin from its locking position when the solenoid is activated. Activating the electronic switch would displace the locking pin via the solenoid and allow the platform to be displaced and relocated, after which the platform could be locked by deactivating the electronic switch thereby returning the locking pin to its locking position.

The adjustment bracket 32 discussed above can further include one or more hooks 34 coupled to the adjustment bracket 32 and operable with the adjustment rod 36 to retain the adjustment rod 36 and maintain the locking pin 240 in a disengaged position. The hooks 34 may be configured so that an underside of the hook 34 is substantially at the same position as the top surface of the adjustment rod 36 when the rod 36 has displaced the locking pin 240 from its locking position. The hook 34 can be further configured to temporarily retain the adjustment rod 36 after disengaging the locking pin 240, and to release the adjustment rod 36 upon displacement of the platform 260 in either direction. In this manner, an operator can disengage the locking pin 240 from its locking position via the adjustment rod 36 and place the adjustment rod 36 under the hook 34 to hold the rod 36 in place and to maintain the locking pin 240 in an upward position, overcoming the bias acting on the locking pin 240. An operator may then displace the platform 260, wherein the hook 34 releases the adjustment rod 36 and the locking pin 240 is compelled via the spring 244 to rest on the surface of the bottom plate 114 and to assume a locking position once an available locking position is encountered.

Figure 7:
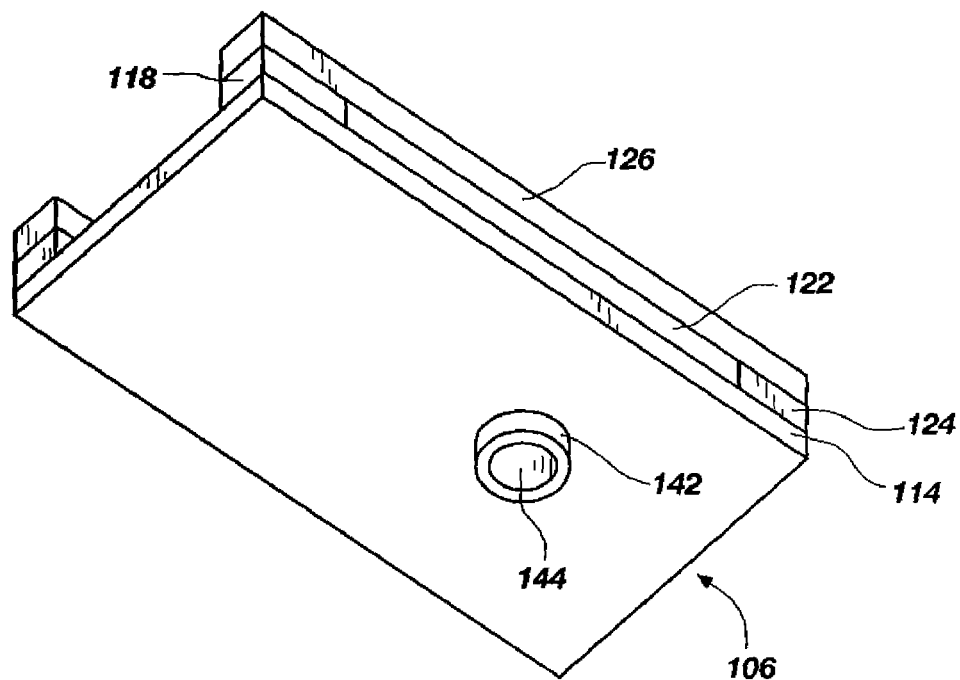
FIG. 7 illustrates a perspective view of the bottom plate of the adaptive displaceable fifth-wheel hitch system of FIG. 2.
Figure 8:
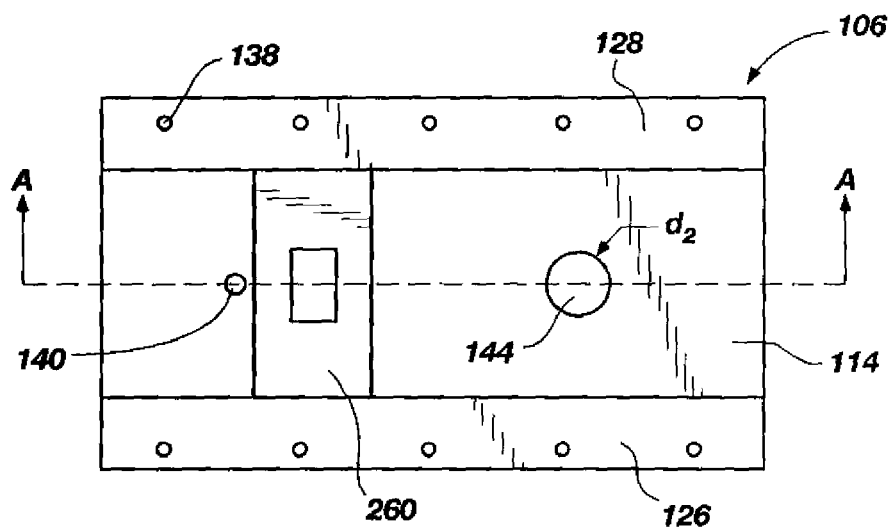
FIG. 8 illustrates a top view of the bottom plate of FIG. 7.

With reference to FIGS. 7 and 8, the bottom plate 114 is shown as further comprising a shim 142 attached to the underside of the bottom plate 114 that positions the platform track 120 above the surface of the vehicle (not shown). The shim 142 further comprises a central opening 144. The bottom plate 114, shim 142, and central opening 144 comprise the structural arrangement that provides or defines an interface for the coupling means used to secure the platform track 120 and the entire displacement mechanism associated therewith to a known and compatible vehicle hitch coupling system. The bottom plate 114, shim 142, and central opening 144 are also preferably used to provide and define the interface usable by the present invention adapter to operably relate and secure the associated displacement mechanism to a different and otherwise incompatible vehicle hitch coupling system, such as described above. One skilled in the art will recognize, however, that other structural arrangements, and thus other interface configurations, are entirely possible and that those specifically described herein, and shown in the drawings, are not meant to be limiting in any way.

Figure 10:
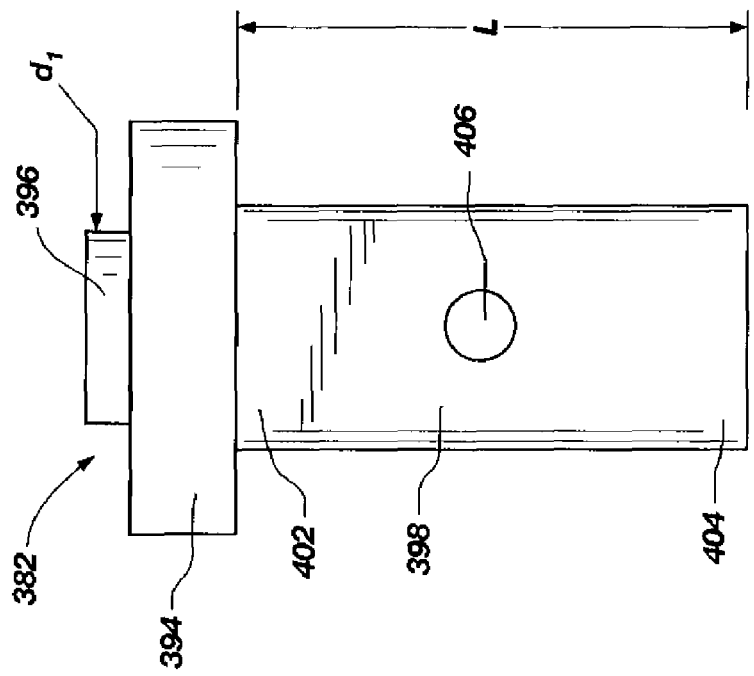
FIG. 10 illustrates a side view of the adapter of FIG. 9.
Figure 9:
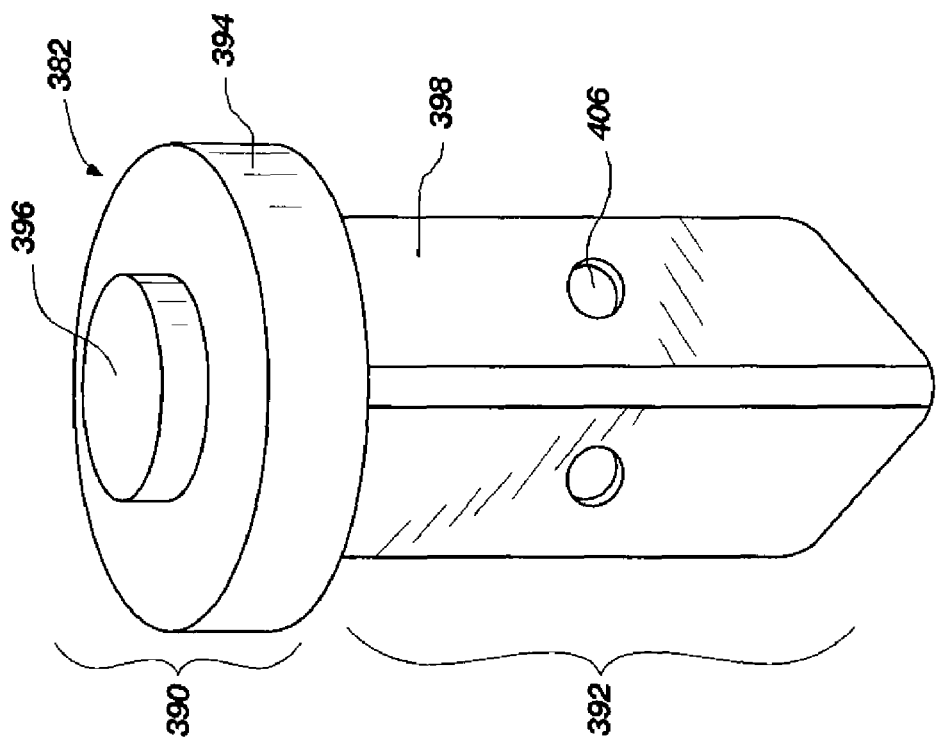
FIG. 9 illustrates a perspective view of the adapter as part of the adaptive displaceable fifth-wheel hitch system of FIG. 2.

With reference to FIGS. 9 and 10, illustrated are detailed perspective and front views, respectively, of the adapter 382 of FIG. 2. The adapter 382 comprises a mounting component 390 having a base 394 situated about a first end 402 of the coupling component 392, and particularly the post 398. The base 394 is shown as comprising a cylindrical geometry, but obviously other geometries may be used. Extending upward from the base 394, in a direction opposite that of the post 398, is a plug 396, also having a cylindrical geometry. As with the structural arrangement of the central opening 144 of the platform track 120, the mounting component 390 of the adapter 382 may also comprise other configurations that will be apparent to those skilled in the art. As such, the mounting components discussed herein and shown in the drawings are not meant to be limiting in any way.

Referring now to FIGS. 7-10, the mounting component 390 of the adapter 382 may be interfaced with the corresponding structural arrangement on the platform track 120 in order to join the adapter 382 to the platform track 120. As specifically shown, the plug 396, which comprises a diameter $d_1$ slightly less than the diameter $d_2$ of the central opening 144, may be inserted into the central opening 144 and the mounting component 390 advanced until the base 394 is properly seated against the underside surface of the platform track 120, or more specifically the underside surface of the shim 142. Once properly seated in this position, the adapter 382 may be secured to the platform track 120 by welding the base 394 of the adapter 382 to the shim 142. As discussed, less permanent joining means or methods may be employed, such as providing matching threads along the outer edge or surface of the plug 396 and about the inner surface of the central opening 144, wherein the adapter 382 may be screwed into place and secured by a lock washer or other known means.

Referring back to FIGS. 9 and 10, the adapter 382 further comprises a coupling component 392 having a post 398 extending from the base 394 of the mounting component 390 in a direction opposite that of the plug 396. The post 398 comprises a substantially square cross-section and a length L that corresponds to a cross-section and a length of a receiving component of a vehicle hitch coupling system (not shown, but see FIG. 2). The post also may comprise one or more apertures formed therein, such as aperture 406 sized and configured to receive a securing pin of the vehicle hitch coupling system, thereby securing the adapter 382 and the displacement mechanism to the vehicle hitch coupling system, and in place within the vehicle. This is discussed in greater detail below. Again, the coupling component 392 may comprise many different configurations other than those described and shown herein, which will be apparent to those skilled in the art. The coupling component may comprise a configuration suitable to enable the adapter to be securely and removably coupled to the vehicle hitch coupling system.

Figure 11:
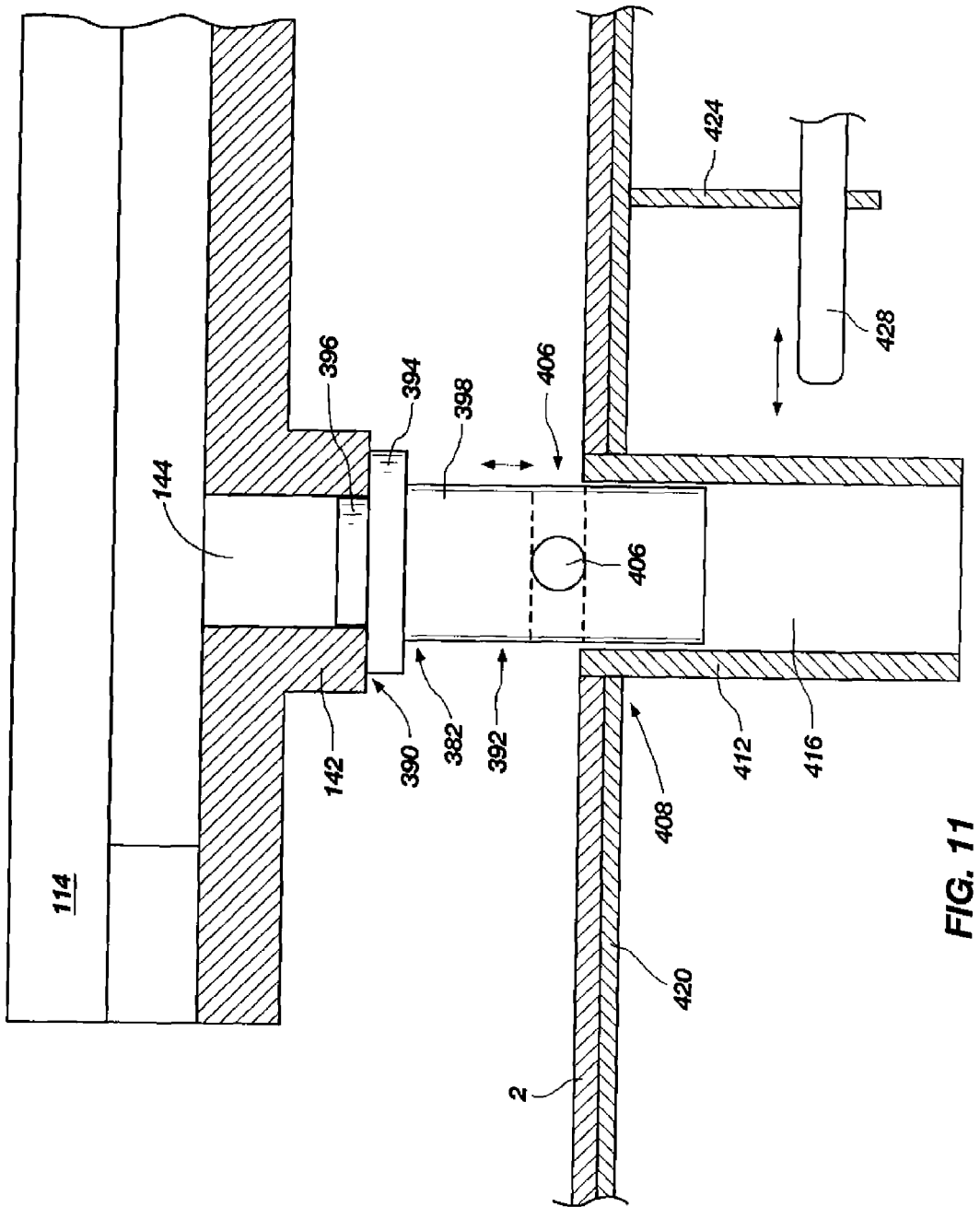
FIG. 11 illustrates a partial cross-sectional side view of the adaptive fifth wheel hitch system of FIG. 2, wherein the adapter is shown as operatively coupling a bottom plate of a displacement mechanism of one type to a vehicle hitch coupling system otherwise operable with a displacement mechanism or fifth-wheel hitch assembly of a different type.
Figure 12:
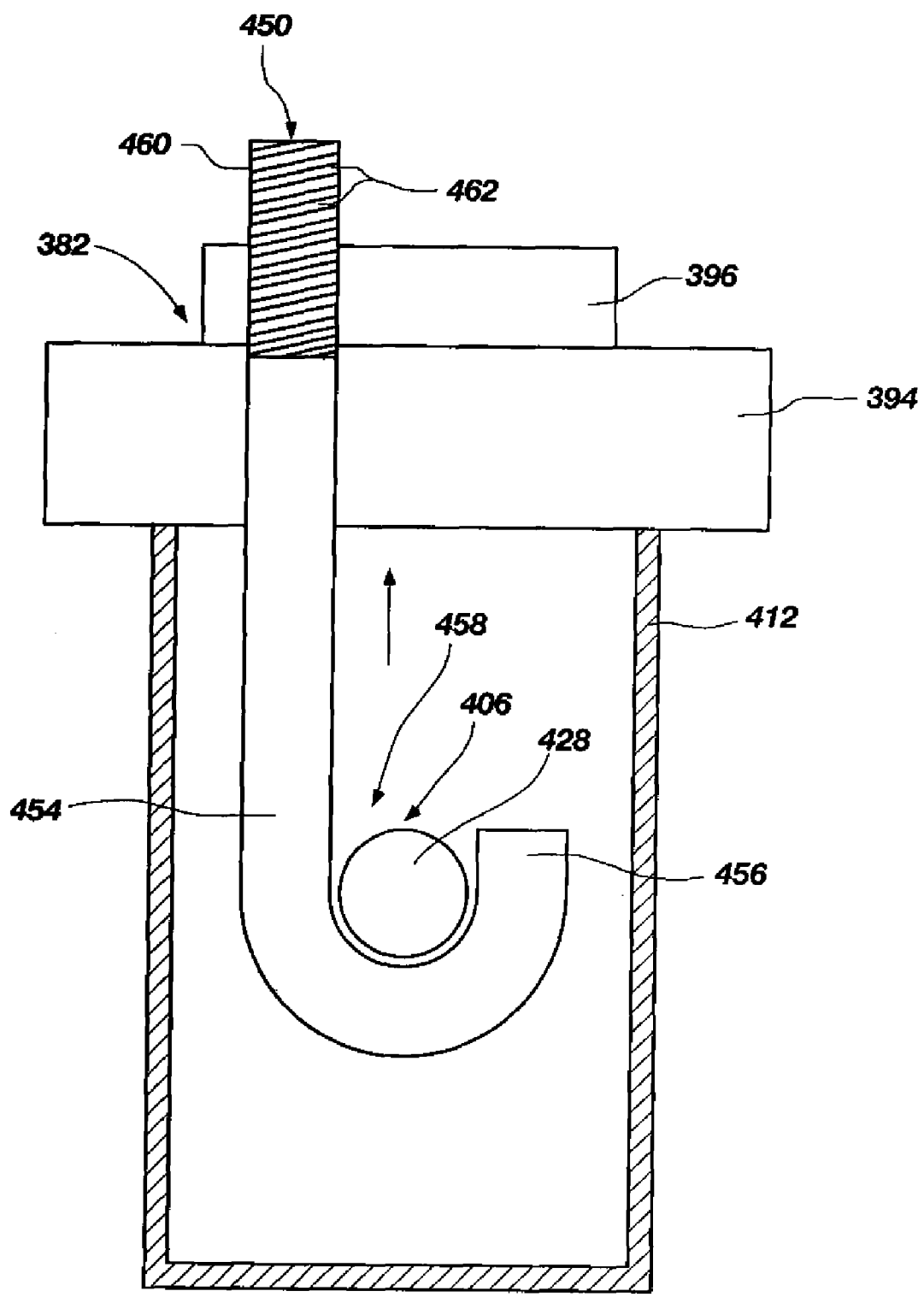
FIG. 12 illustrates a side view of an adapter and a j-bolt configured to enhance the coupling of an adapter and a vehicle hitch coupling system in accordance with one exemplary embodiment of the present invention.

With reference to FIGS. 11 and 12, illustrated is a partial cross-sectional side view of the adaptive displaceable fifth-wheel hitch system of FIG. 2, wherein the adapter 382 is shown as operably coupling the platform track 114 of a displacement mechanism of one type to a vehicle hitch coupling system otherwise operable with a displacement mechanism or fifth-wheel hitch assembly of a different type. The platform track 114 is shown in cross-section as being taken along lines A-A of FIG. 8. The mounting component 390 of the adapter 382 is securely joined with the platform track 114, wherein the plug 396 is inserted into the central opening 144, such that the base 394 is properly seated about the underside of the platform track 114, more specifically the shim 142. With the adapter 382 secured in this position, the platform track 114 may be lowered into the vehicle 2 and the coupling component 392, and particularly the post 398 inserted into the opening 416 defined by the receiving component 412 of the vehicle hitch coupling system 408. The vehicle hitch coupling system may comprise a vehicle mounting assembly 420 that securely couples to the vehicle 2, such as via the frame or other structure(s), as known in the art, and that functions to support the receiving component 412, and ultimately the adaptive displaceable fifth-wheel hitch system.

Once inserted into the receiving component 412, the adapter 382 may be secured into place using the securing means of the existing vehicle hitch coupling system. As such, the adapter 382 further comprises a configuration and interface intended to utilize such existing securing means in a similar manner as the type of displacement mechanism or fifth-wheel hitch assembly that is typically and commonly operable with the vehicle hitch coupling system. As shown, the vehicle hitch securing system comprises a biased pin 428 supported by the mounting assembly 420, and particularly a support 424, which pin 428 is configured to be received within the aperture 406 formed in the post 398, and to extend through the post 398, upon the aperture 406 being properly aligned with the pin 428, as known in the art.

The above-described securing of the adapter 382 within the receiving component 412 using the pin 428 may be further enhanced to reduce any play or slack between the adapter 382 and the vehicle hitch coupling system. As such, the present invention adaptive displaceable fifth-wheel hitch system further comprises means for enhancing the securing of the adapter. FIG. 12 illustrates a side view of an adapter 382 as secured within a receiving component 412, with pin 428 properly inserted through aperture 406. FIG. 12 further illustrates, as one exemplary means for enhancing, a j-bolt 450 operable to further secure the adapter 382 within the receiving component 412. The j-bolt 450 comprises a shaft 454 shaped to comprise an upturned end 456 forming a recess 458 sized and configured to receive the pin 428 therein. The shaft 454 further comprises a second end 460 having threads 462 formed therein for facilitating tightening of the j-bolt 450, which effectively functions to induce an upward force on the pin 428 and a downward force on the adapter 382, thus drawing the pin and the adapter 382 together. As the j-bolt 450 is tightened, the pin 428 is forced upward against the adapter 382, thus securing the connection between the pin 428 and the adapter 382 to remove any play or slack therein.

Figure 13:
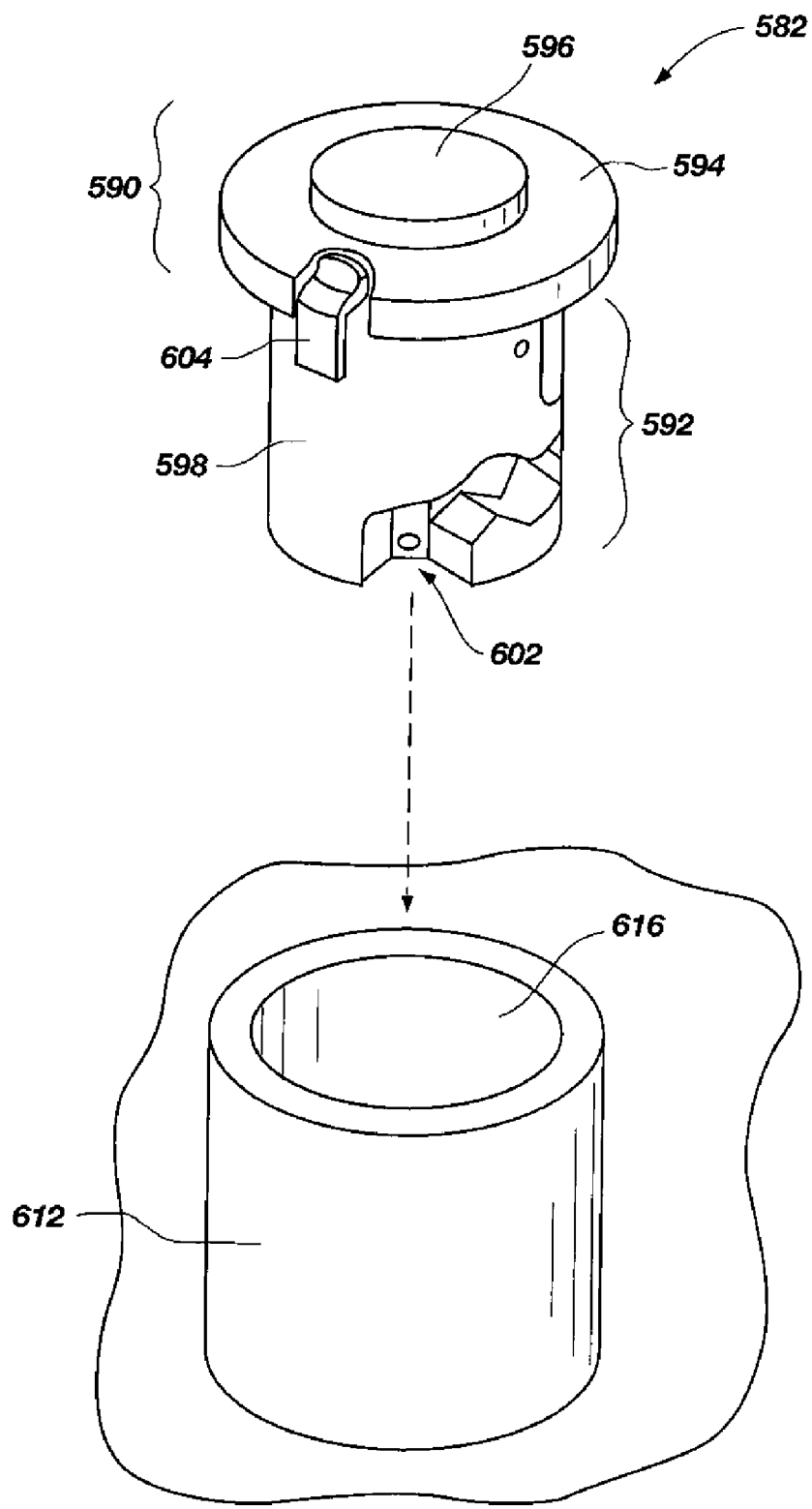
FIG. 13 illustrates a perspective view of an adapter operable within an adaptive displaceable fifth-wheel hitch system in accordance with another exemplary embodiment of the present invention.

With reference to FIG. 13, illustrated is an adapter for use within an adaptive displaceable fifth-wheel hitch system in accordance with another exemplary embodiment of the present invention. As shown, the adapter 582 comprises a mounting component 590 having a base 594 and a plug 596 similar to the adapter 382 discussed above with respect to FIGS. 2, 7-12, and configured to interface with the fifth-wheel hitch assembly of FIG. 2. As such, the description provided above is incorporated herein, where applicable, with respect to this particular embodiment. The adapter 582 further comprises a coupling component 592 having a post 598. The post 598 comprises a recess 602 for receiving a securing member therein, which securing member is part of an existing vehicle hitch coupling system. The coupling component 592 further comprises a biased release 604 designed and configured to facilitate insertion and removal of the adapter 582 from the receiving component 612 of the vehicle hitch coupling system. Similar to the embodiment described above, the adapter 582 may be inserted into the recess 616 of the receiving component 612 for the purpose of securing the adapter 582, and therefore the adaptive displaceable fifth-wheel hitch system, to the vehicle hitch coupling system.

It is noted that the coupling component 592 of the adapter 582, as well as the receiving component 612, are similar to the coupling component of the Diamond Hitch™ and corresponding receiving component of the vehicle hitch coupling system manufactured and sold by Blue Ox® of Pender, Nebr.

Figure 14:
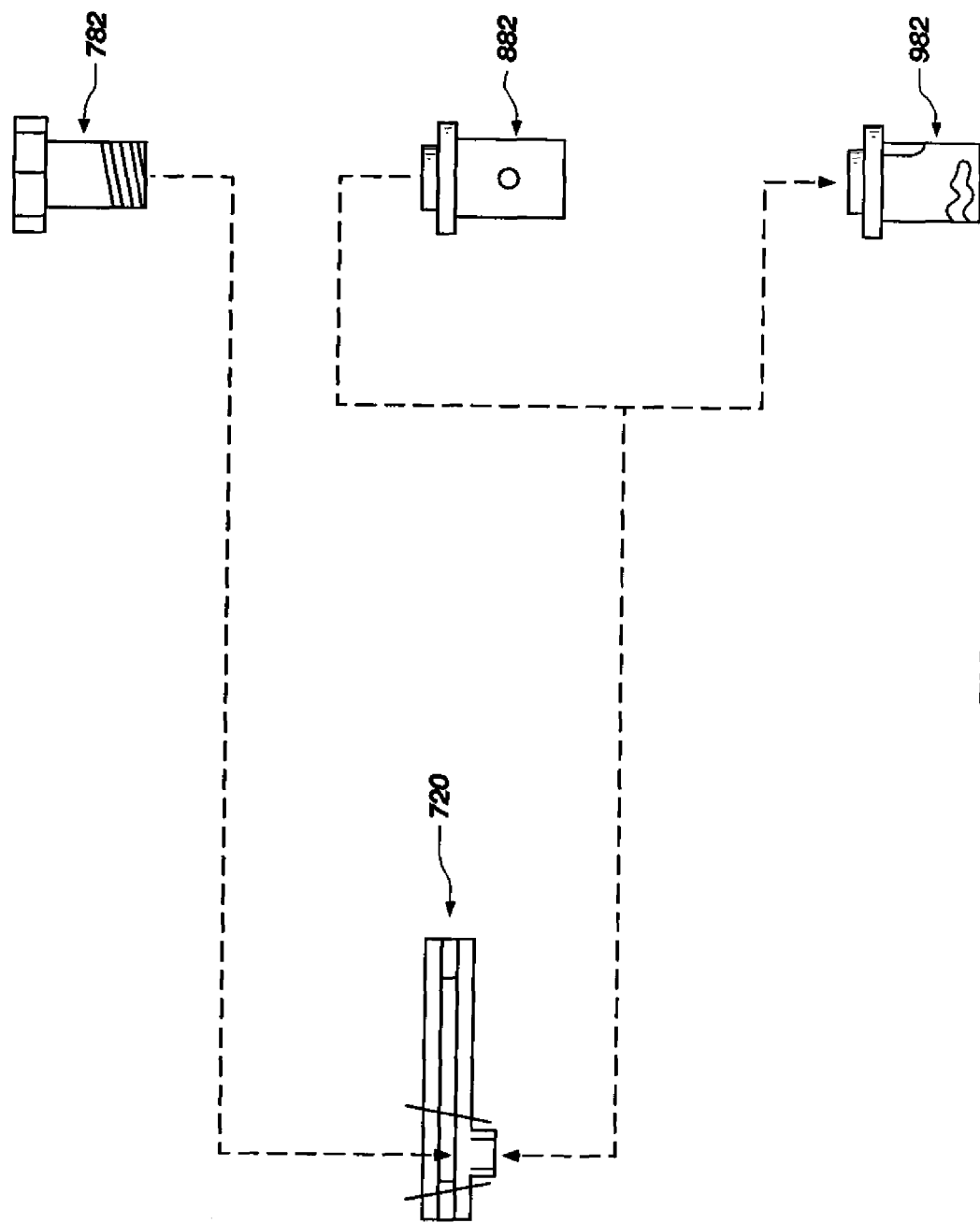
FIG. 14 illustrates how a bottom plate of a displacement mechanism is intended to be operable with a plurality of adapters in order to operably couple the bottom plate and an associated displacement mechanism and fifth-wheel hitch to different vehicle hitch coupling systems simply by using different adapters.

With reference to FIG. 14, illustrated is a platform track 720 of a fifth-wheel hitch and associated displacement mechanism (not shown), shown as being operable with several different adapter types, namely adapters 782, 882 and 982, in order to enable the fifth-wheel hitch and displacement mechanism to be used with multiple different types of vehicle hitch coupling systems. It will be obvious to one skilled in the art that other types of adapters may be utilized, other than those specifically shown herein. In addition, it will be obvious to one skilled in the art that the adapters may comprise different interfaces to enable them to be used with different displacement mechanisms and vehicle hitch coupling systems.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. An adaptive displaceable fifth-wheel hitch system comprising:
   a vehicle hitch coupling system;
   a fifth-wheel hitch;

a displacement mechanism operable with said fifth-wheel hitch to displace said fifth-wheel hitch in a bi-directional manner relative to said vehicle, said displacement mechanism having an interface configuration different from an interface configuration of said vehicle hitch coupling system, said displacement mechanism being incapable of mating with, and directly coupling to, said vehicle hitch coupling system; and an adapter that removably couples said displacement mechanism and said vehicle hitch coupling system, said adapter comprising:

a first interface providing a mounting component coupled to said displacement mechanism; and a second interface having a coupling component coupled to said vehicle hitch coupling system.

2. The adaptive displaceable fifth-wheel hitch system of claim 1, wherein said displacement mechanism further comprises:

a stationary support;

a movable support operable with said stationary support and configured to displace said fifth wheel hitch, as coupled to the movable support, in a hi-directional manner relative to the stationary support;

means for locking said movable support with respect to said stationary support; and means for facilitating the displacement of said movable support and said fifth-wheel hitch.

3. The adaptive displaceable fifth-wheel hitch system of claim 2, wherein said adapter is coupled to said stationary support.

4. The adaptive displaceable fifth-wheel hitch system of claim 1, wherein said adapter is removably joined to said stationary support.

5. The adaptive displaceable fifth-wheel hitch system of claim 1, wherein said adapter is permanently joined to said stationary support.

6. The adaptive displaceable fifth-wheel hitch system. of claim 2, further comprising a riser operable with said movable support and configured to secure said fifth-wheel hitch to said movable support.

7. The adaptive displaceable fifth-wheel hitch system of claim 2, wherein said fifth-wheel hitch is directly connected to said movable support.

8. The adaptive displaceable fifth-wheel hitch system of claim 2, wherein the means for locking comprises a latching mechanism configured to mechanically hold said movable support in place with respect to said stationary support.

9. The adaptive displaceable fifth-wheel hitch system of claim 2, wherein the means for locking comprises an electromagnet electrically coupled to an electrical switch, wherein said electromagnet is configured to be selectively activated to lock said movable support in place with respect to said stationary support.

10. The adaptive displaceable fifth-wheel hitch system of claim 2, further comprising a mechanical device configured to permit the displacement of said movable support and said fifth-wheel hitch.

11. The adaptive displaceable fifth-wheel Wheel hitch system of claim 2, further comprising an electrical device that activates the means for locking and facilitates the displacement of said movable support and said fifth-wheel hitch.

12. An adaptive displaceable fifth-wheel hitch system, comprising:

a vehicle hitch coupling system having a receiving component;

a fifth-wheel hitch;

a displacement mechanism configured to be mounted in the bed of a truck and to permit bi-directional displacement of said fifth-wheel hitch relative to said truck, said displacement mechanism having an interface configuration different from an interface configuration of said receiving component of said vehicle hitch coupling system, said displacement mechanism being incapable of mating with, and directly coupling to, said vehicle hitch coupling; and an adapter that removably couples said displacement mechanism and said vehicle hitch coupling system, said adapter comprising:

a mounting component, having a first interface, coupled to said displaceable fifth-wheel hitch assembly; and a coupling component, having a second interface, coupled to said vehicle hitch coupling system, said coupling component corresponding to said receiving component of said vehicle hitch coupling system.

13. The adaptive, displaceable fifth-wheel hitch system of claim 12, wherein said displacement mechanism further comprises:

a platform track defining a track space therein and configured to be stationary with respect to said truck;

a displaceable platform configured to be positioned in said track space and operable to support said fifth-wheel hitch, and to permit bi-directional displacement of said fifth-wheel hitch within said track space of said platform track and relative to said truck;

an interface member that locates the fifth-wheel hitch in an elevated position above the platform track; and an adjustment assembly operable with the platform track to facilitate displacement of the platform and the fifth-wheel hitch, and to lock the platform and the fifth-wheel hitch in one of a plurality of positions.

14. The adaptive displaceable fifth-wheel hitch system of claim 13, wherein said adjustment assembly further comprises a pin assembly operable with said platform, said pin assembly comprising a locking pin that engages one of several receiving apertures located in a bottom plate of said displacement mechanism.

15. The pin assembly of claim 14, wherein said locking pin is biased to engage said receiving apertures.

16. The adaptive displaceable fifth-wheel hitch system of claim 13, further comprising a spacer operable with said platform track and configured to locate said platform track above the bed of said truck.)

17. The adaptive displaceable fifth-wheel hitch system of claim 13, further comprising a support device operable with said platform track and configured to support said platform track about said bed of said vehicle.

18. The adaptive displaceable fifth-wheel hitch system of claim 17, wherein said support device comprises at least one adjustable support bracket that adjusts vertically, to vary a height of said platform track relative to said bed of said vehicle.

19. The adaptive displaceable fifth-wheel hitch system of claim 13, wherein said fifth-wheel hitch is supported by said platform, and configured to removably couple a fifth-wheel trailer.

20. The adaptive displaceable fifth-wheel hitch system of claim 19, wherein said fifth-wheel hitch comprises a base component supported by said platform, and a head component supported by said base.

21. The adaptive displaceable fifth-wheel hitch system of claim 13, wherein said interface member comprises a riser coupled to said platform and configured to support said fifth wheel hitch.

22. The adaptive displaceable fifth-wheel hitch system of claim 13, wherein said platform track is configured to maintain said platform in a first locking position in said track space and configured to allow said platform to displace in a rearward direction to a second locking position within, said track space.

23. The adaptive displaceable fifth-wheel hitch system of claim 13, wherein said adjustment assembly comprises:
an adjustment rod; and
an adjustment bracket operable with said adjustment rod to facilitate the displacement of said platform and said fifth-wheel hitch by facilitating the release of the platform from a locked position.

24. The adaptive displaceable fifth-wheel hitch system of claim 23, further comprising:
a window formed through said adjustment bracket and configured to permit said adjustment rod to be placed through said adjustment bracket;
means for releasing said platform from a locked position, wherein said adjustment rod is placed through said window, attached to a locking pin, and operated to displace said locking pin from a locking position; and
a hook coupled to said adjustment bracket and configured to facilitate the displacement of said platform and said fifth-wheel hitch by securing said adjustment rod in a position with said locking pin removed from a locked position prior to the displacement of said platform.

25. The adaptive displaceable fifth-wheel hitch system of claim 12, further comprising means for enhancing the coupling of the adapter within the receiving component.

26. The adaptive displaceable fifth-wheel hitch system of claim 25, wherein said means for enhancing comprises a j-bolt coupled to said adapter that engages a pin of said vehicle hitch coupling system, and that facilitates the drawing together of said pin and said adapter upon tightening said j-bolt to reduce any play therebetween.

* * * * *